Sept. 27, 1966 C. SHEERAN 3,275,969
WIRE SHORTENING AND TYING DEVICE
Filed Nov. 2, 1964 2 Sheets-Sheet 1
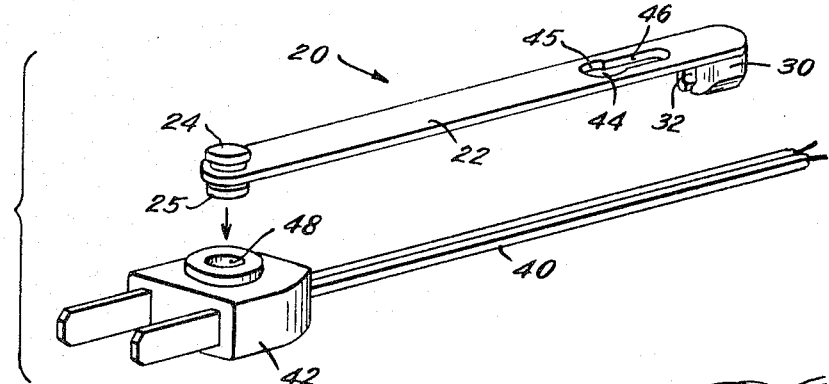
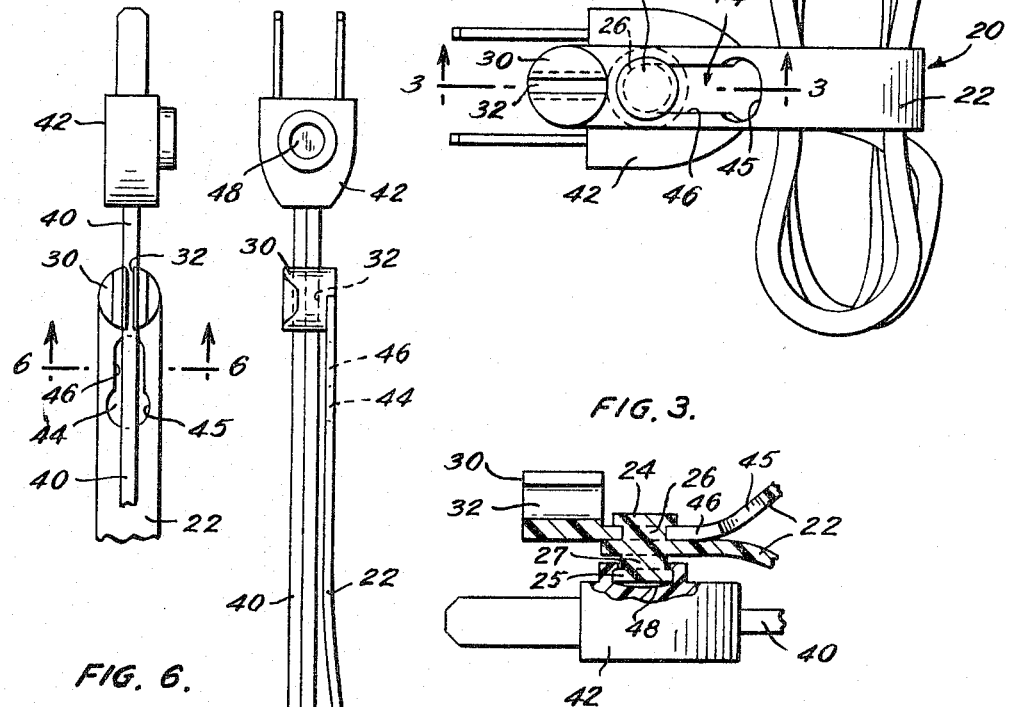
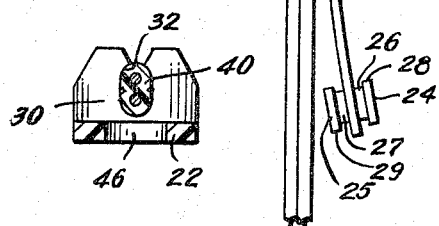
INVENTOR.
CHARLES SHEERAN,
BY
Salter & Michaelson
ATT'YS.

Sept. 27, 1966  C. SHEERAN  3,275,969
WIRE SHORTENING AND TYING DEVICE
Filed Nov. 2, 1964  2 Sheets-Sheet 2
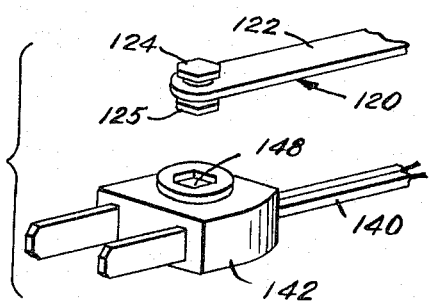
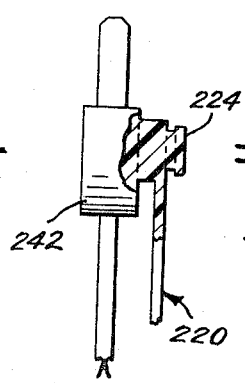
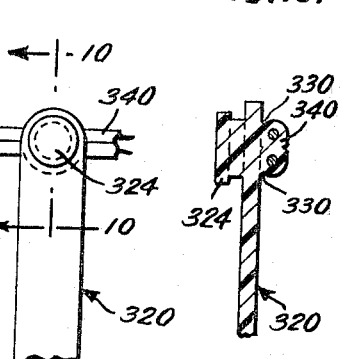
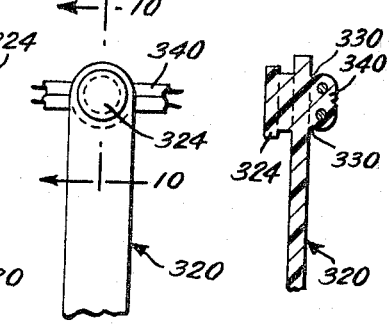
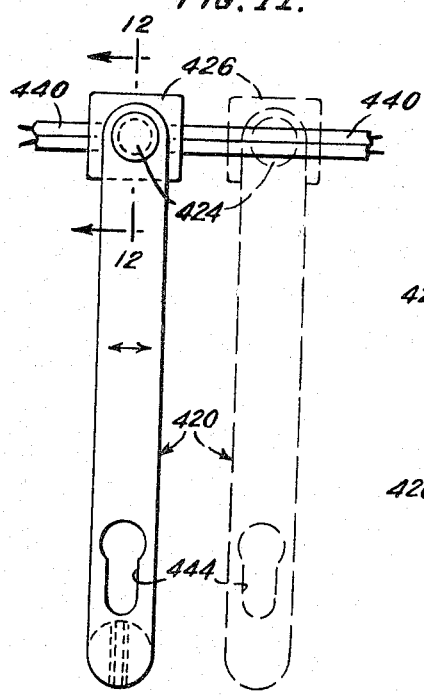
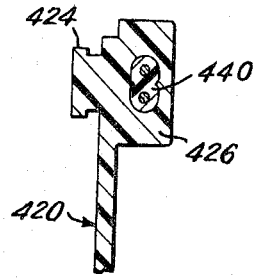
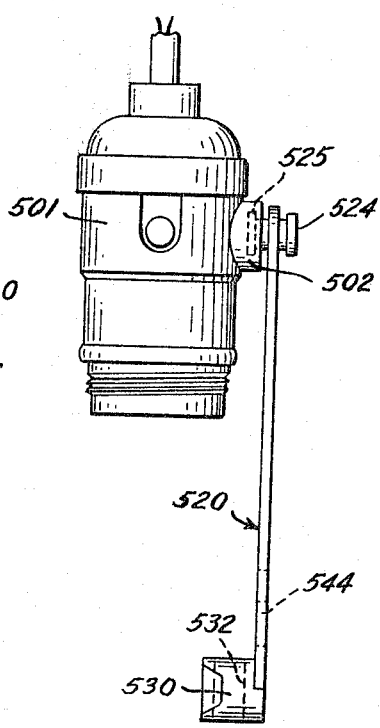
INVENTOR.
CHARLES SHEERAN,
BY Salter & Michaelson
ATT'YS.

United States Patent Office 3,275,969
Patented Sept. 27, 1966

3,275,969
WIRE SHORTENING AND TYING DEVICE
Charles Sheeran, Cranston, R.I., assignor to Victor Electric Wire & Cable Corp., Coventry, R.I.
Filed Nov. 2, 1964, Ser. No. 408,070
14 Claims. (Cl. 339—103)

This invention relates to a tie for electric wires and the like. More particularly it relates to a device for conveniently shortening an electric cord for an appliance.

It can broadly be stated that almost every electrical appliance presently used in the home has an electric cord of some kind. These cords vary extensively in length, for example from six feet to as much as twenty feet for a vacuum cleaner. This is true because of the variations in the spacing of electrical outlets from one building to another and the uncertainty of the location where the appliance will be used. As a result the electrical cords are designed to be as long as is generally believed necessary to take care of a wide possibility of uses. Thus when the cords are joined from a working appliance to an electrical outlet the cords often form an unsightly tangle and possibly an obstacle over which persons may trip. One approach to this problem has been to provide some appliances with self-retracting reels for the cords. However, not all appliances have the room for such reels and in other instances the cost of such a solution may not be warranted.

The present invention overcomes the difficulties described above by providing a novel strap in cooperation with a portion of the cord for tying a portion of the electrical cord into folds.

An important object of the invention is therefore to provide novel and improved means for tying an electrical cord into folds whereby not only may the cord be shortened when in use, but also the cord may be tied into a compact bundle when the cord is not in use and is to be stored, this being particularly valuable and beneficial where the cord is of the type that is separable from the appliance with which the cord is associated, such as is frequently the case in connection with electric shavers, flat irons and the like.

Another object of the invention is to provide a novel strap for tying a portion of an electrical cord, which strap is capable of being constructed so that it may, as dictated by various requirements, be joined in cooperation with either the electric cord or its plug or to the appliance itself.

A further object is to provide a novel strap for tying a portion of an electrical cord which is inexpensive to manufacture, is simple to use and is susceptible of wide use.

These and other objects and advantages will become apparent from the following specification and the accompanying drawings in which are set forth by way of example certain embodiments of my invention.

FIG. 1 is a perspective view of one embodiment of the invention showing a shortener strap for use in cooperation with an electrical cord plug.

FIG. 2 is a top plan view of the combination of FIG. 1 showing the combination in use.

FIG. 3 is a longitudinal partial cross-section taken along line 3—3 of FIG. 2.

FIG. 4 is a plan view of the embodiment of FIG. 1 illustrating the arrangement of parts for shortening an electrical cord at an intermediate point.

FIG. 5 is a side elevational view of the combination of FIG. 4.

FIG. 6 is a cross-section taken along line 6—6 of FIG. 5.

FIG. 7 is a portion of a perspective view similar to FIG. 1 of a modification of the combination of FIG. 1 wherein the strap may be prevented from rotating and held at a desired angle in the plug.

FIG. 8 is a partial cross-section of a different modification of the invention wherein the strap is integral with the plug.

FIG. 9 is plan view of still another modification of the invention wherein the strap may be made integral with the wire.

FIG. 10 is a cross-section taken along line 10—10 of FIG. 9.

FIG. 11 is a plan view of still another modification of the invention wherein the strap has a portion molded about the electric cord and adapted to be slidable thereon.

FIG. 12 is a cross-section taken along line 12—12 of FIG. 11.

FIG. 13 is a side elevational view of still another modification of the invention showing the strap joined to an appliance (at light socket).

Referring now in greater particularity to the drawings in which like numbers are used to designate like parts in the different views, 20 generally designates the strap of the combination of FIG. 1. This strap is constructed of a flat elongated web portion 22 with a button 24 and 25 extending from each side of the web at one end. Each button 24 and 25 has a circular neck portion 26 and 27 respectively and a flat circular cap 28 and 29 respectively (see FIG. 4).

At the other end of the web 22 is a boss 30 through which extends a slot 32 in a direction parallel to the web 22. The slot is deep enough to encompass a wire or electric cord 40 which is joined at one end to an electrical plug 42. Through the web, adjacent the boss is a key hole shaped hole 44 with an enlarged circular portion 45 and a narrower elongated portion 46 extending toward the boss 30.

The plug 42 has a receptacle 48 which is molded into the plug and is adapted to receive button 25 (see FIG. 3).

In operation the strap 20 may be used as a cord shortener at the plug 42 as shown in FIG. 2. This is accomplished by plugging the button 25 into the receptacle 48. The cord 40 is then folded into loops 50 to shorten it to a desired length. The strap 20 is then carried around the center of the loops 50 and the button 24 inserted in the hole 45 and then slipped into the slot 46.

At times it may be impractical or unsightly to shorten the cord at the plug. It is then desired to therefore shorten the cord at some intermediate point the boss 30 may be engaged with the cord 40 by inserting the cord 40 into the slot 32 at the desired point of the cord. From then on loops may be formed similar to the loops 50 and the strap 20 then carried around these loops. The button 24 or 25 may then be inserted into the slot 46 as described above to shorten the cord.

In FIG. 7 a modification of the button and receptacle shown in the figure respectively as 124–125 and 148 is depicted which is non-rotatable; a modification which permits the strap 120 to be set at an angle to the plug 142 and wire 140 and held at that angle. The embodiment shown has a hexagonal button and receptacle. However, it should be understood that other forms of non-round and/or straight sided configurations may be used, depending on the angles and adjustability of the angles desired between the strap 120 and the wire 140.

A second modification (FIG. 8) shows the strap as an integral strap 220 with an electric plug 242. This is accomplished by molding the strap as part of the plug 242 with a button 224 for engagement with a slot (not shown) which is similar to the slot 44 of FIG. 1.

A third embodiment (FIGS. 9 and 10) shows the strap as an integral strap 320 with an electric cord 340. This is accomplished by molding or adhesively joining one side of the strap as part of the wire 340 with fillets 330 integral with the wire and strap. A button 324 for engagement with a slot (not shown) which is similar to the slot 44 of FIG. 1 is placed on the other side of the strap.

Occasionally, while it may be desirable to have a retaining strap integral with the electric cord, it may be necessary to have such a strap mounted slidably on the wire. Such an embodiment is shown in FIGS. 11 and 12. Here is shown a strap 420 which is molded about an electric wire or cord 440 but not as a part of the wire. The separate construction is best seen at FIG. 12 which shows the strap 420 as integral with a retaining block 426 to which a retaining button 424 is joined. This button is intended to be inserted in slot 444 for retaining a portion of wire 440. The dashed line construction in FIG. 11 is used to illustrate the slidability of the block 426 and strap 420. The block need only be pushed along the wire to a desired location.

In FIG. 13 there is illustrated an embodiment which has the strap fastened to an appliance, which is shown here as a light socket. The socket, indicated here as 501 has a button receptacle 502 in which a button 525 is contained. This button has a strap 520 joined to it at one end. At the other end of the strap is a boss 530 which contains a slot 532 (shown by a dotted line). Adjacent the boss is a button receiving slot 544. This slot 544 is formed to receive a button 524 which is joined to the button 525. While, in this embodiment, the button 525 is shown as a separate construction from the receptacle 502, requiring that the button be snapped into the receptacle when it is desired to join the strap 520 to the socket 501, it is a simple alternative to make the receptacle 502 and button 525 as an integral unit. Should it be considered necessary to use the latter construction then the strap 520 may be made to slip over button 524.

In operation the modifications of FIGS. 7–10 are similar to the embodiment of FIGS. 1–6 in that the end portions of all of the embodiments (FIGS. 7–10) have end portions corresponding to the portion containing web 22, boss 30, slot 32 and keyhole shaped hole 44. These end portions are looped about the shortened electric cord or wire and the keyhole shaped holes engaged with the buttons 124, 224, and 324 of the respective FIGS. 7, 8 and 9.

FIGS. 11 and 13 illustrate complete constructions and the operation of the embodiments illustrated in these figures is similar to the other embodiments in that keyhole shaped holes 444 and 544 are intended to engage respective buttons 424 and 524 after the respective bands 420 and 520 have been looped about the electric cord which is to be contained.

It is to be understood that the above description and accompanying drawings are to be deemed primarily as illustrative of preferred modes presently contemplated of carrying out the principles of the invention, and that the devices described and illustrated may be modified or altered in form, proportions, detail of construction and arrangement of parts without departing from the spirit and scope of the invention as defined in the appended claims.

What I claim and desire to secure by Letters Patent is:

1. A tie for securing into a bundle a plurality of folded portions of an electrical wire which is a part of an electrical assembly, said tie comprising a relatively thin flexible strap having two ends and two flat sides
   (A) a raised boss at one end of said strap having,
      (1) a groove therein adapted to receive a portion of said electrical wire
   (B) an elongated hole through said strap adjacent said boss,
   (C) a button extending from one flat side of said strap at the other end of said strap, said button having
      (1) a flat cap
      (2) a neck portion smaller in diameter than said cap and adapted to fit in said elongated hole in engagement with the sides of said hole retained therein by said cap,
   (D) means at the same end of said strap as said button and at the other flat side of said strap for joining said strap to said electrical assembly.

2. A device as called for in claim 1 wherein the said means at the same end of the strap comprises a button extending from the other flat side of said strap with a flat cap similar to the button extending from said one side.

3. A device as called for in claim 2 wherein both flat caps of both buttons are hexagonal in shape.

4. A device as called for in claim 1 wherein the said means at the same end of the strap comprises a block molded to the other flat side of said strap.

5. A device as called for in claim 4 wherein said molded block is adapted to slide on said electrical wire.

6. A device as called for in claim 1 wherein the said means at the same end of the strap includes integral fillets adapted to join said strap and said electrical wire.

7. In combination, an electrical device having an electrical wire extending therefrom forming an electrical assembly and a tie for securing into a bundle a plurality of folded portions of said wire
   (A) said tie comprising a relatively thin flexible strap having two ends and two flat sides
      (1) a raised boss at one end of said strap having,
         (a) a groove therein adapted to receive a portion of said electrical wire
      (2) an aperture through said strap adjacent said boss
      (3) a button extending from one flat side of said strap at the other end of said strap, said button being adapted to pass through said aperture and fasten therein
   (B) means at the same end of said strap as said button and at the other flat side of said strap and on said electrical assembly for joining said strap to said assembly.

8. A combination as called for in claim 7 wherein said button has a flat cap and a necked in portion between said strap and said flat cap.

9. A combination as called for in claim 7 wherein the said means at the same end of said strap as said button and at the other flat side of said strap and on said electrical assembly comprises a second button similar to said button extending from said one flat side of said strap and a receptacle in said electrical device for receiving said second button.

10. A combination as called for in claim 9 wherein both said buttons have similar flat caps of a straight sided configuration and said receptacle has a matching flat sided configuration.

11. A combination as called for in claim 10 wherein the configuration of both flat caps and said receptacle is that of a hexagon.

12. A combination as called for in claim 7 wherein the said means at the same end of said strap as said button and at the other flat side of said strap and on said electrical assembly comprises a block molded to the other flat side of said strap and said electrical assembly.

13. A combination as called for in claim 7 wherein the said means at the same end of said strap as said button and at the other flat side of said strap and on said electrical assembly comprises a block molded to the other flat side of said strap, said block being slidably joined to said electric wire.

14. A tie for securing into a bundle a plurality of folded portions of an electrical wire which is a part of an electrical assembly, said tie comprising a relatively thin flexible strap having two ends and two substantially flat sides, a molded block extending integrally from one of said flat sides, an opening extending through said block for slidably receiving said electric wire, an elongated hole through said strap adjacent one end thereof, and a button extending from one flat side of said strap at the other end thereof, said button having a flat cap, a neck portion smaller in diameter than said cap and adapted to fit in said elongated hole and to be retained therein by said cap.

References Cited by the Examiner

UNITED STATES PATENTS 2,896,889  7/1959  Hershberger.
3,090,826  5/1963  Cochran.
3,122,386  2/1964  Pearson.

FOREIGN PATENTS 621,307  8/1962  Belgium.

BERNARD A. GELAK, *Primary Examiner.*